United States Patent [19]
Palanca et al.

[11] Patent Number: 6,073,210
[45] Date of Patent: Jun. 6, 2000

[54] SYNCHRONIZATION OF WEAKLY ORDERED WRITE COMBINING OPERATIONS USING A FENCING MECHANISM

[75] Inventors: Salvador Palanca; Vladimir Pentkovski, both of Folsom; Subramaniam Maiyuran, Fair Oaks, all of Calif.; Lance Hacking, Portland, Oreg.; Roger A. Golliver, Beaverton, Oreg.; Shreekant S. Thakkar, Portland, Oreg.

[73] Assignee: Intel Corporation, Santa Clara, Calif.

[21] Appl. No.: 09/053,377

[22] Filed: Mar. 31, 1998

[51] Int. Cl.$^7$ .............................. G06F 13/14; G06F 12/00
[52] U.S. Cl. ........................................ 711/118; 711/167
[58] Field of Search ..................................... 711/118, 167

[56] References Cited

U.S. PATENT DOCUMENTS

| | | | |
|---|---|---|---|
| 5,751,996 | 5/1998 | Glew et al. | 711/145 |
| 5,826,109 | 10/1998 | Abramson et al. | 710/39 |
| 5,881,262 | 3/1999 | Abramson et al. | 712/216 |
| 5,900,020 | 5/1999 | Safranek et al. | 711/167 |

*Primary Examiner*—Jack A. Lane
*Attorney, Agent, or Firm*—Blakely, Sokoloff, Taylor & Zafman LLP

[57] ABSTRACT

The present invention discloses a method and apparatus for synchronizing weakly ordered write combining operations. A memory controller has a buffer to service memory accesses. A store fence instruction is dispatched to the memory controller. If the buffer contains at least a data written by at least one of the weakly ordered write combining operations prior to the store fence instruction, then the store fence instruction is blocked until a block in the buffer containing the data is globally observed. If the buffer does not contain any data written by at least one of the write combining operations prior to the store fence instruction, then the store fence instruction is accepted by the memory controller.

20 Claims, 12 Drawing Sheets

SYNCHRONIZATION OF WEAKLY ORDERED WRITE COMBINING OPERATIONS USING A FENCING MECHANISM

BACKGROUND OF THE INVENTION

1. Field of the Invention

This invention relates to microprocessor systems. In particular, the invention relates to synchronization of weakly ordered write combining operations using a fencing mechanism.

2. Description of Related Art

All memory accesses in a computer system are required to follow a given set of rules to ensure that all agents in the system are working with the correct version of the data. The most rigid set of rules, referred to as strong ordering, requires among other things that all stores from a given agent are observable by other agents in the order in which they were issued, i.e., the program order.

While strong ordering guarantees correctness, it does so at the expense of performance. Processors can achieve high performance for storing information to memory if they are allowed to follow weaker rules. The weak ordering rule gives the processor the freedom to choose the highest performance way to store data into memory.

The weak ordering rule allows instructions to be executed out of order. This rule enhances processor's performance because instructions can be executed as soon as resources are available, avoiding wasteful idle periods.

However, at a particular reference time, the program running on a given agent may need to guarantee that all previous stores (or writes) from that agent have been observed by all other agents. In addition, the program may also want to ensure that all stores by that agent subsequent to that particular reference time will not be observable before any previous stores. In essence, the agent wants to synchronize all stores issued by itself with respect to a particular timing point.

Prior art synchronization methods include the use of input/output (I/O) instructions, privileged instructions, uncacheable memory references, serializing instructions, and locked instructions. These methods implement the synchronization as part of their primary functions. However, these methods have a number of drawbacks. First, they all require the use of at least one register, taking away valuable storage resources. Second, they are slow due to the time spent to perform the primary function. Third, it is unclear to the programmer if the fencing mechanism is actually implemented. Fourth, except serializing and locked instructions, other methods are privileged and not available to the applications users.

Therefore there is a need in the technology to provide an efficient method to synchronize weakly ordered write combining operations without using much hardware resources.

SUMMARY OF THE INVENTION

The present invention discloses a method and apparatus for synchronizing weakly ordered write combining operations. A memory controller has a buffer to service memory accesses. A store fence instruction is dispatched to the memory controller. If the buffer contains at least a data written by at least one of the weakly ordered write combining operations prior to the store fence instruction, then the store fence instruction is blocked until a block in the buffer containing the data is globally observed. If the buffer does not contain any data written by at least one of the write combining operations prior to the store fence instruction, then the store fence instruction is accepted by the memory controller.

BRIEF DESCRIPTION OF THE DRAWINGS

The features and advantages of the invention will become apparent from the following detailed description of the invention in which.

DESCRIPTION OF THE PRESENT INVENTION

A method and apparatus for synchronizing weakly ordered write combining operations using a fencing mechanism is disclosed. The fencing is performed by dispatching an SFENCE instruction. The SFENCE instruction is accepted only when all the prior stores are globally observed and before all subsequent stores are globally observed. Two techniques are used to implement the fencing mechanism. Pre-serialization and post-serialization techniques support operations before and after, respectively, the SFENCE. There are default behavior and enhance behavior in each technique.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
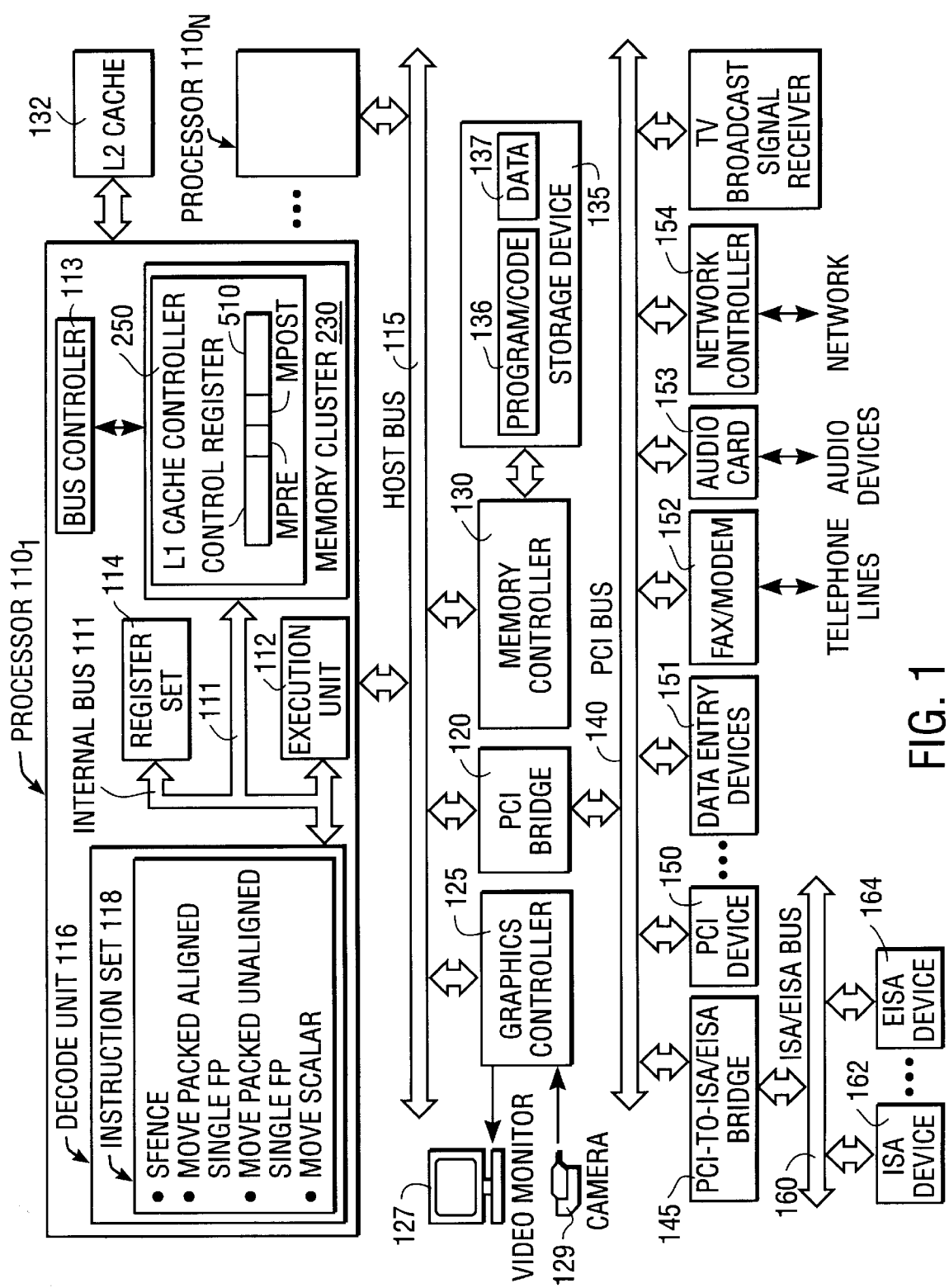
FIG. 1 is a diagram illustrating one embodiment of a system in accordance with the teachings of the present invention.

FIG. 1 is a diagram illustrating one embodiment of a computer system 100 in accordance with the teachings of the present invention. Computer system 100 comprises a number of processors $110_1$ through $110_N$, a bus bridge 120, an external cache (e.g., L2 cache) 132, and a memory controller 130.

Each of the processors $110_1$ through $110_N$ represents a central processing unit of any type of architecture, such as CISC, RISC, VLIW, or hybrid architecture. In addition, each of the processors $110_1$ through $110_N$ is capable of multiprocessing although this invention can be practiced without the requirement of multiprocessing capabilities. The processors $110_1$ through $110_N$ are coupled to the bus bridge 120 and the memory controller 130 via a host bus 115. While this embodiment is described in relation to a single processor computer system, the invention could be implemented in a multiprocessor computer system.

The bus bridge 120 provides an interface between the host bus 115 and an expansion bus 140 (e.g., PCI bus). The bus bridge 120 (e.g., PCI bridge) also provides a graphic port, e.g., Accelerated Graphics Port (AGP), for connecting to a graphics controller 125. While one embodiment is shown that includes a graphic port, alternative embodiments can support graphics capture and display using any number of techniques. The graphics controller 125 is interfaced to a video monitor 127 and a camera 129. The video monitor 127 displays graphics and images rendered or processed by the graphics controller 125. The camera 129 acquires images and transfers and image data to the graphics controller 125.

The memory controller 130 provides an interface between the host bus 115 and a storage device 135. The storage device 135 represents one or more mechanisms for storing data. For example, the storage device 135 may include read only memory (ROM), random access memory (RAM), magnetic disk storage mediums, optical storage mediums, flash memory devices, and/or other machine-readable mediums. FIG. 1 also illustrates that the storage device 135 has stored therein data 137 and program/code 136. Data 137 represents data stored in one or more of the formats described herein. Program code 136 represents the necessary code for performing any and/or all of the techniques in the present invention. Of course, the storage device 135 preferably contains additional software (not shown), which is not necessary to understanding the invention.

The expansion bus 140 represents an expansion bus that allows the processors $110_1$ through $110_N$ to communicate with a number of peripheral devices. The expansion bus 140 provides an interface to an expansion-to-peripheral bridge 145 (e.g., PCI-to-ISA/EISA bridge), an expension device 150 (e.g., PCI device), a data entry device controller 151, a fax/modem controller 152, an audio card 153, a network controller 154, and a TV broadcast signal receiver 155.

The expansion-to-peripheral bridge 145 represents an interface device between the expansion bus 140 and an peripheral bus 160. The peripheral bus 160 represents a peripheral bus (e.g., ISA/EISA bus) that interfaces to a number of peripheral devices, including an ISA device 162 and an EISA device 164. The expansion device 150 represents any device that is interfaced to the expansion bus 140. The data entry interface 151 represents an interface to data entry devices such as tablet digitizer, mouse, etc. The fax/modem 152 represents a fax and/or modem for receiving and/or transmitting analog signals representing data. The audio card 153 represents one or more devices for inputting and/or outputting sound (e.g., microphones, speakers, magnetic storage devices, optical storage devices, etc.). The network controller 155 represents one or more network connections (e.g., an ethernet connection). The TV broadcast signal receiver 155 represents a device for receiving TV broadcast signals.

BASIC PROCESSOR ARCHITECTURE

FIG. 1 additionally illustrates that the processor $110_1$ includes a decode unit 116, a set of registers 114, a bus controller 113, a memory cluster 230, an execution unit 112, and an internal bus 111 for executing instructions. Of course, the processor $110_1$ contains additional circuitry, which is not necessary to understanding the invention. The decode unit 116, registers 114 and execution unit 112 are coupled together by the internal bus 111. The bus controller 113 provides interface to the host bus 115 and an external cache 132 (e.g., L2 cache). The decode unit 116 is used for decoding instructions received by processor 110 into control signals and/or microcode entry points. In response to these control signals and/or microcode entry points, the execution unit 112 performs the appropriate operations. The decode unit 116 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention. The memory cluster 230 includes a L1 cache controller 250 which contains a control register 510. The control register 510 has two mode selection bits pre-serialization mode (MPRE) and post-serialization mode (MPOST).

The decode unit 116 is shown including packed data instruction set 118 for performing operations on packed data. In one embodiment, the packed data instruction set 118 includes the following instructions: a store fence, a move packed aligned, a move packed unaligned, and a move scalar. In addition to the packed data instructions, the processor $110_1$ can include new instructions and/or instructions similar to or the same as those found in existing general purpose processors. For example, in one embodiment the processor $110_1$ supports an instruction set which is compatible with the Intel Architecture instruction set used by existing processors, such as the Pentium® processor manufactured by Intel Corporation of Santa Clara, Calif. Alternative embodiments of the invention may contain more or less, as well as different, packed data instructions and still utilize the teachings of the invention.

The registers 114 represent a storage area on processor $110_1$ for storing information, including control/status information, integer data, floating point data, and packed data. It is understood that aspects of the invention are the described instruction set for operating on packed data, as well as how those instructions are used. According to these aspects of the invention, the storage area used for storing the packed data is not critical. The term data processing system is used herein to refer to any machine for processing data, including the computer systems(s) described with reference to FIG. 1.

Figure 2:
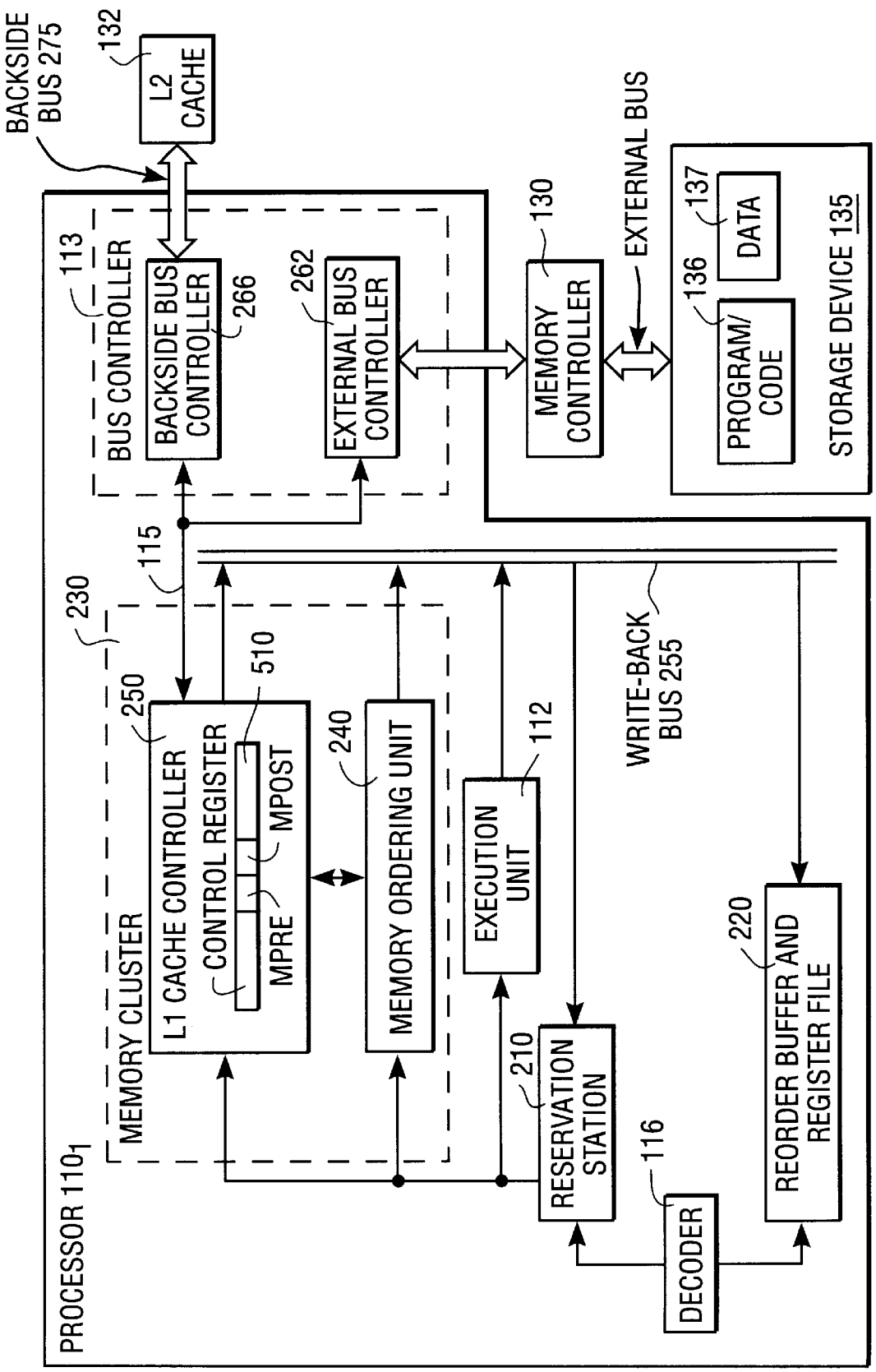
FIG. 2 is a diagram illustrating one embodiment of a processor in accordance with the teachings of the present invention.

FIG. 2 is a diagram illustrating one embodiment of the computer system 100 in accordance with the teachings of the present invention. While one exemplary computer system is described, the invention can be implemented in any number of different computer systems (e.g., one that has more or less cache levels, one that uses a different register renaming and/or out-of-order execution architecture). For simplicity, only relevant elements of the system 100 are shown. The computer system 100 includes the processor 110, a backside bus 275, a level 2 (L2) cache subsystem 132, the processor bus 115, the memory controller 130, and the storage device 135.

The processor 110 includes the decoder 116, a reservation station 210, a re-order buffer and register file 220, the execution unit 112, a memory cluster 230, a bus controller 113, and a write-back data bus 255. The memory cluster 230 further includes a memory ordering unit 240 and a Level 1 (L1) cache controller 250. For simplicity, the L1 cache memory is not shown. The L1 cache controller 250 contains the control register 510 having two mode bits MPRE and MPOST.

The decoder 116 issues instructions to the reservation station 210 and to the re-order buffer 220. The reservation station 210 dispatches the decoded instruction to the execution unit 112 and the memory cluster 230. If the instruction is ready to be executed, the execution unit will carry out the operation. If the instruction is a memory-referencing instruction, it will be dispatched to the memory ordering unit 240 for preparation for access the L1 cache (for cacheable instructions only) via the L1 cache controller 250.

The write-back bus 255 provides the data path for the L1 cache controller 250 or the execution unit 112 to return the data back to the re-order buffer and the register file 220 and the reservation station 210.

The bus controller 113 provides an interface between the processor 110 and the L2 cache subsystem 132 and the bus 115. The bus controller 113 includes an external bus controller 262 and a backside bus controller 266. The external bus controller 262 provides the interface to the bus 115 to which the memory controller 130 is connected. The backside bus controller 266 provides an interface to the L2 cache subsystem 132 via the backside bus 275.

Figure 3:
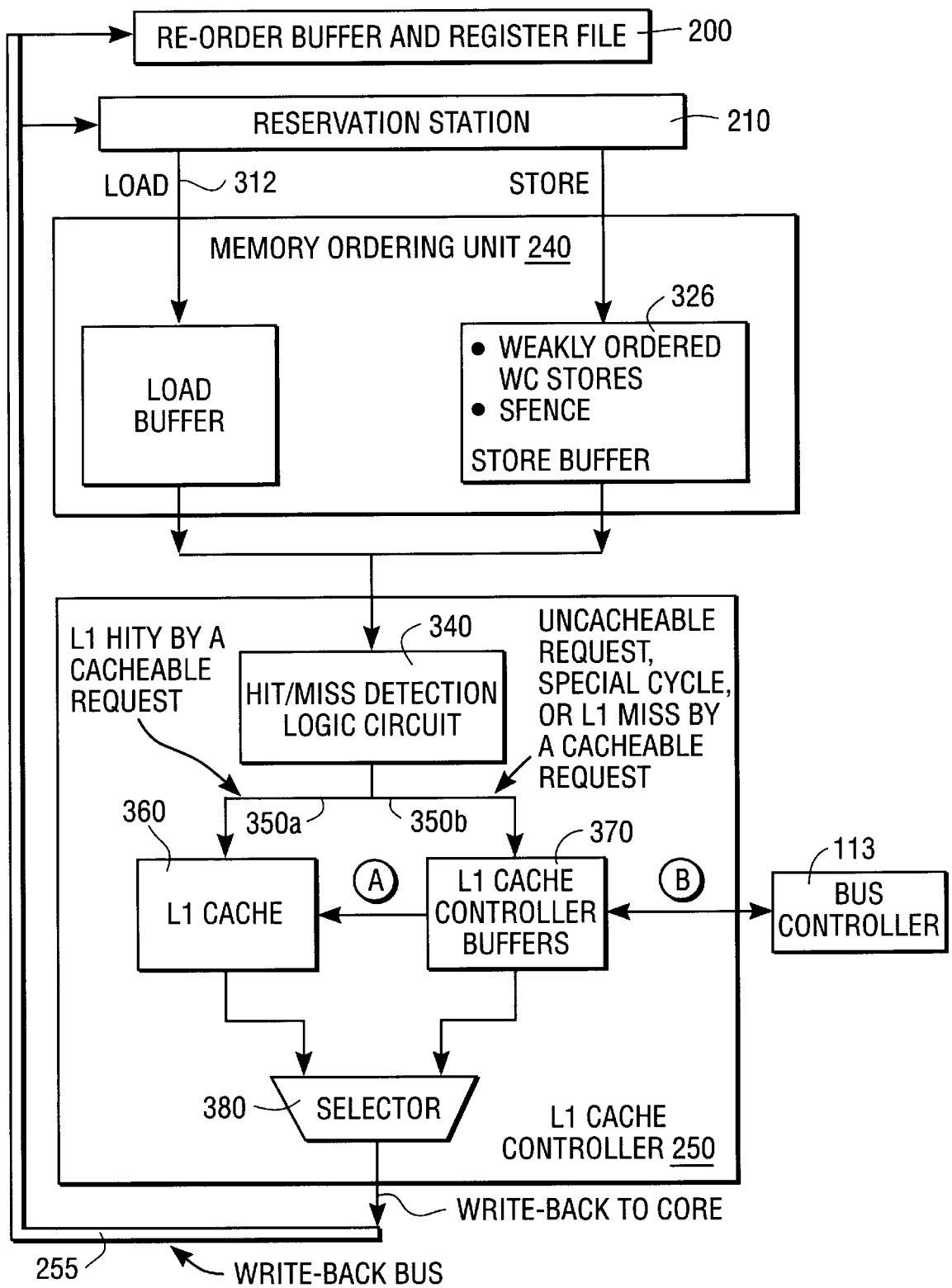
FIG. 3 is a diagram illustrating a relationship and data paths between the reservation unit and the memory control elements according to one embodiment of the invention.

FIG. 3 is a diagram illustrating the relationship and data paths between the reservation station 210 and the various memory control elements. It is assumed that the decoded instructions are memory-referencing instructions.

As shown in FIG. 3, the reservation station dispatches the instruction to the memory ordering unit 240 via the Load Bus 312 or the Store Bus 316 if the instruction is a load or store instruction, respectively. The memory ordering unit 240 includes a load buffer unit 322 and a store buffer unit 326. The load buffer unit 322 receives the load instructions via the load bus 312. The store buffer unit 326 receives the store instructions via the store bus 316. The store buffer unit 326 receives the weakly ordered WC stores and the store fence (SFENCE) instruction to synchronize the weakly ordered WC stores.

Instructions in the load buffer unit 322 and store buffer unit 326 are dispatched to the L1 cache controller 250. The L1 cache controller 250 includes a hit/miss detection logic 340, a L1 cache 360, a L1 cache controller buffer 370, and a write-back selector 380. The hit/miss detection logic 340 detects if the load or store instruction hits the L1 cache or any other L1 cache controller array or buffer structure. If the instruction is a cacheable request and has a L1 hit, the cache access is provided via a bus 350A to the L1 cache 360. If the instruction is an uncacheable request, a special cycle, or cacheable request with a L1 miss, the request is routed to the L1 cache controller buffer 370 via a bus 350B. For a cacheable request with a L1 miss, the missing data is transferred to the L1 cache 360 from the L1 cache controller buffer unit 370 via path A. This data typically comes from the L2 cache or the external memory.

The bus controller 113 services the requests from the L1 cache controller buffer 370 via path B. For cacheable request misses or uncacheable loads, the data flow is from the bus controller 260 to the L1 cache controller buffer 370. For uncacheable stores or writes, the data flow is from the L1 cache controller buffer 370 to the bus controller 113.

For loads, data are written back to the core, i.e., the re-order buffer and register file 220. The write-back data may come from the L1 cache 360 (for cache hits) or the L1 cache controller buffer 370 (for cacheable misses or uncacheable loads). The selector 380 switches between these two write-back sources to the write-back bus 255. The write-back data are then written to the re-order buffer and register file 220 and the reservation station, and the write-back data valid bit is written to the re-order buffer.

Figure 4:
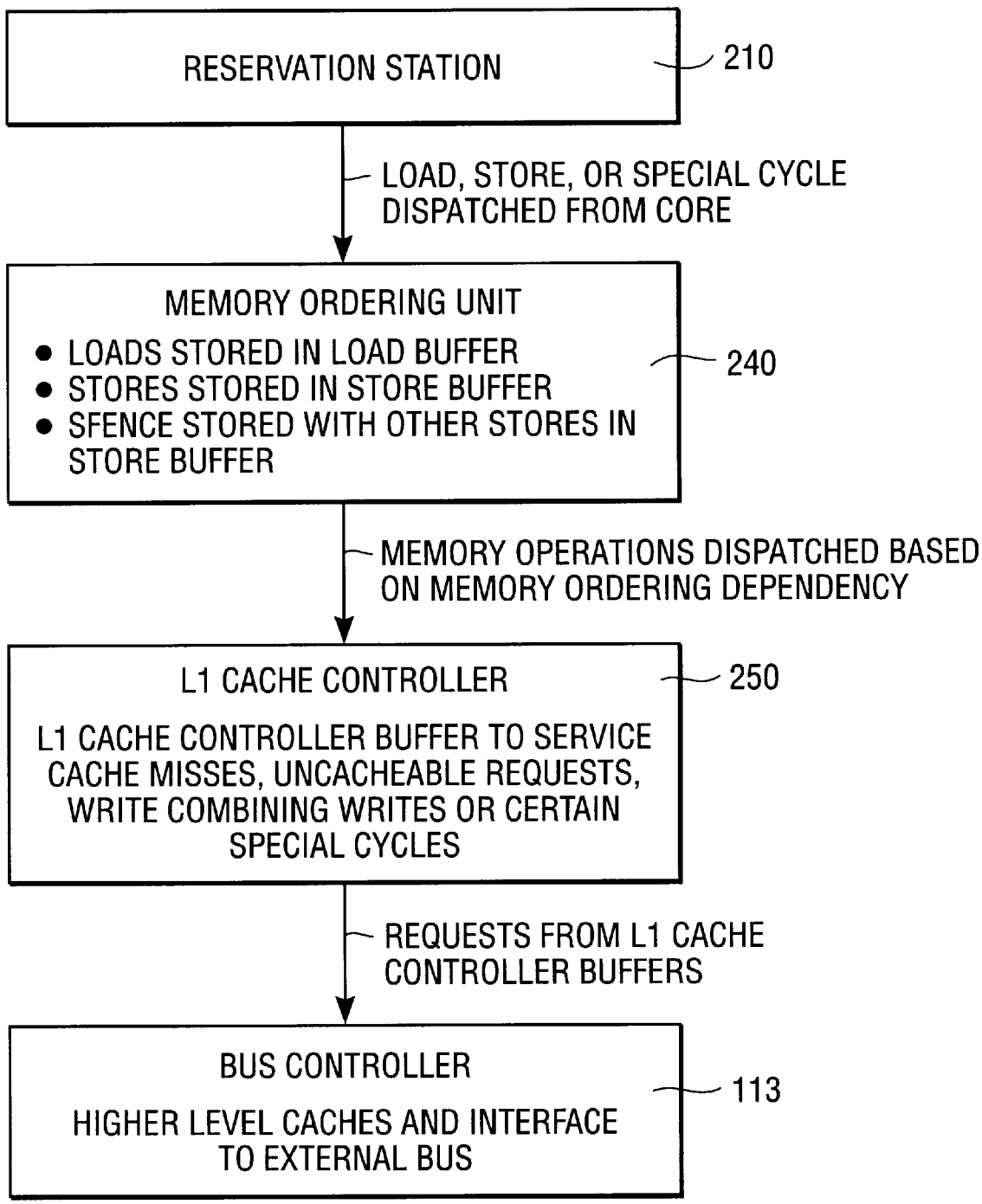
FIG. 4 is a diagram illustrating a data flow between different elements in the processor according to one embodiment of the invention.

FIG. 4 is a diagram illustrating the data flow between different elements in the processor. As shown in FIG. 4, the data flow involves the reservation station 210, the memory ordering unit 240, the L1 cache controller 250, and the bus controller 113.

From the reservation station 210 to the memory ordering unit 240, the data flow includes a load, a store, and a special cycle. These data requests are dispatched from the processor core. At the memory ordering unit 240, all loads are stored in the load buffer unit, all stores (or writes) are stored in the store buffer unit, all store fence instructions are stored with other stores in the store buffer unit.

The memory operations involved in the loads, stores, or store fences are dispatched from the memory ordering unit 240 to the L1 cache controller 250 based on memory ordering dependencies. At the L1 cache controller 250, the L1 cache controller buffer services cache misses, uncacheable requests, write combining writes, and certain special cycles. The execution of the store fence instruction is considered a special cycle. For cache hits by cacheable operations, the L1 cache is accessed.

If the memory operation is satisfied from the L2 cache or the main memory, the L1 cache controller buffer send requests to the bus controller 113. At the bus controller 113, requests are sent to lower level caches such as the L2 cache, or to the main memory.

THEORY OF THE STORE FENCING MECHANISM

Fencing is a mechanism used to ensure synchronization between the processor core and consumer hardware when weakly ordered write combining instructions are used. The STORE FENCE (SFENCE) instruction provides an efficient way of ensuring ordering between instruction streams that produce weakly ordered results.

The SFENCE instruction has no associated data field. The re-order buffer ignores the data on the writeback bus at the cycle of retirement for a SFENCE macro-instruction. In addition, the SFENCE instruction is treated as a no-operation (NOP) by the L1CC (i.e., there us no change in its state). To facilitate synchronization, the SFENCE instruction is dispatched to the L1CC only after all instructions preceding the SFENCE instruction have already been dispatched and accepted by the L1CC.

Write combining (WC) operations provide a protocol in which several writes to a cache line in the L1 cache controller buffers are combined together to transfer that cache line in one operation. By delaying the transfer of a cache line to memory, the bus utilization can be maximized. Other examples include memory referencing operations such as cache line fills.

WC eviction of an uncacheable WC buffer refers to a process in which the L1 cache controller (L1CC) weakly ordered write combining (WOWC) buffer needs to write its contents to the external memory.

The SFENCE mechanism is supported by two serialization techniques: pre-serialization and post-serialization. The pre-serialization and post-serialization techniques include those operations that are in program order before and after, respectively, the SFENCE instruction. Both the pre-serialization and post-serialization techniques provide an option to select a default behavior and an enhanced behavior.

Figure 5:
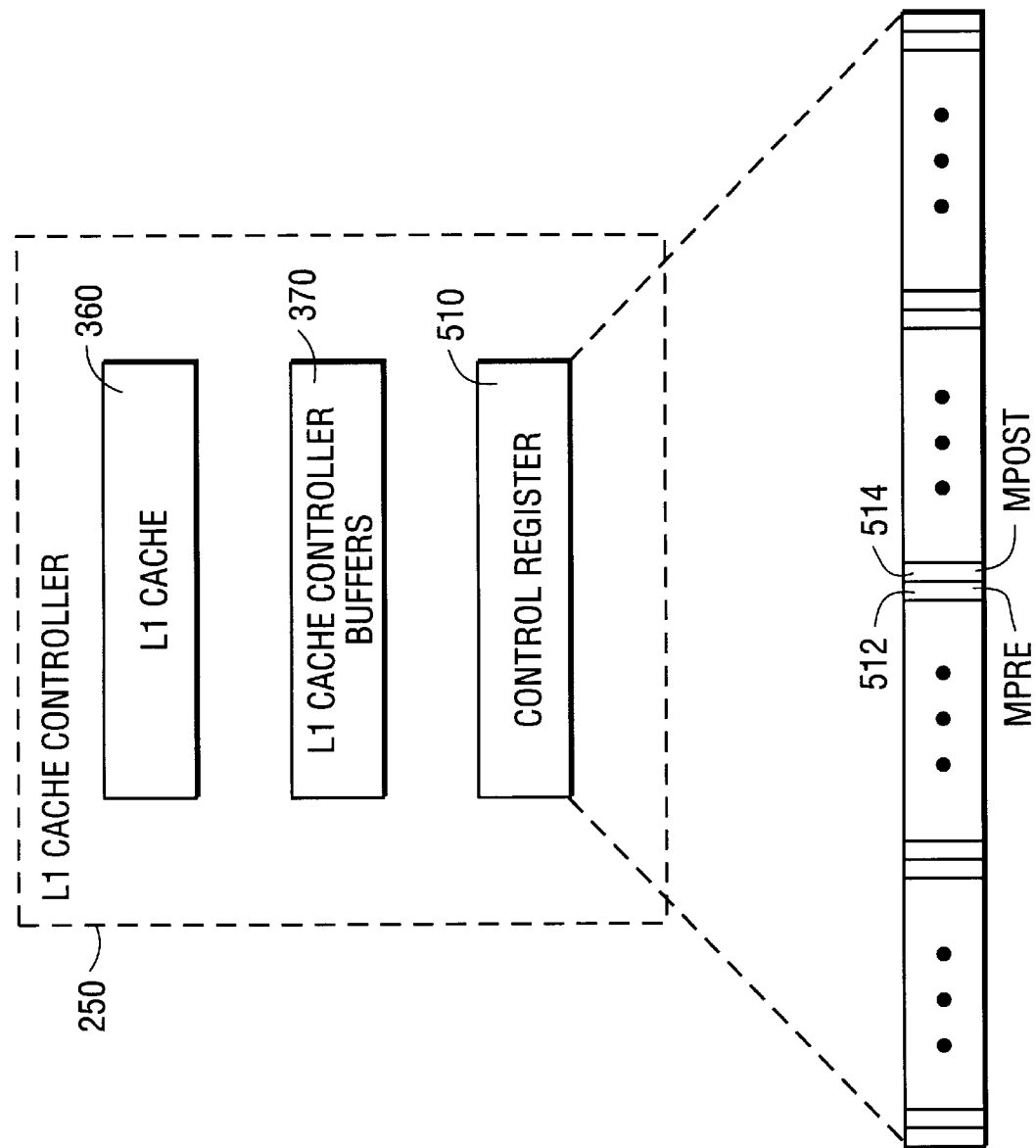
FIG. 5 is a diagram illustrating a control register for mode selection according to one embodiment of the invention.

FIG. 5 is a diagram illustrating a control register 510 in the L1 cache controller according to one embodiment of the invention. The control registers 510 stores a number of bits to control various operations of the L1 cache controller. In one embodiment, the control register 510 includes 32 bits. As shown in FIG. 5, the control register 510 includes a pre-serialization mode (MPRE) bit 512 and a post-serialization mode (MPOST) bit 514.

The MPRE bit 512 is used to select the mode of the pre-serialization techniques. In one embodiment, when the MPRE bit is cleared (i.e., 0), the default behavior mode is selected; when the MPRE bit is set (i.e., 1), the enhanced behavior mode is selected.

The MPOST bit 514 is used to select the mode of the post-serialization techniques. In one embodiment, when the MPOST bit is cleared (i.e., 0), the default behavior mode is selected; when the MPOST bit is set (i.e., 1), the enhanced behavior mode is selected.

Pre-Serialization Techniques

The pre-serialization techniques support the operations before the SFENCE instruction. The SFENCE instruction fences all stores, not just the WC stores. In the L1C, there are a number of buffers that can service various types of memory accesses. The memory accesses relevant to the SFENCE include: cacheable read misses, uncacheable reads, non write-combining (WC) stores, non weakly ordered write combining (WOWC) stores, weakly ordered fully written write combining (WOFWC) stores (i.e., the cache line being serviced is fully written from the core), and weakly ordered partial write combining (WOPWC) stores (i.e., only part of the cache line is written).

A cache line typically consists of 32 bytes, divided into 4 chunks with 8 bytes per chunk. Individual writes to different chunks are combined. Upon an eviction condition, a WOPWC buffer sends an external bus request to the bus controller for each chunk with at least one byte written. Since each write only affects a chunk, to be globally observed, the corresponding WOPWC buffer in the L1CC has to generate at most 4 requests to the external buffer. The exact number of requests generated by the L1CC is equal to the number of chunks written. To simplify the control logic, it is desirable to know when the entire cache line or the corresponding buffer has been globally observed. To do so, it is necessary to keep track of the number of global observations to be sent out.

For cacheable read misses and uncacheable reads the servicing buffers are not checked upon dispatch of a SFENCE to the L1CC. In other words, the L1CC will not block the SFENCE. In this situation, the SFENCE can execute out of order with respect to the previous reads. The SFENCE retires subsequent to a previous load in the program order (i.e., in-order retirement).

For non-WC stores, non-WOWC stores, or weakly ordered fully written write combining (WOFWC) stores, the servicing buffers need to be globally observed before the SFENCE is accepted by the L1CC. The retirement of the SFENCE is gated (or conditioned) upon the previous non-WC, non-WOWC, and WO fully written WC stores being globally observed.

A WOPWC buffer is distinguished from a fully written WC buffer in that its line is only partially written. WOPWC buffers need to be fully completed before the SFENCE is accepted by the L1CC. In other words, the retirement of the SFENCE is gated upon the previous WOPWC stores being completed. The steps after being globally observed for such stores to be completed include writing the data to external memory and subsequent de-allocation from the buffers in the L1CC.

There are two performance options in the pre-serialization techniques. The option selection is implemented by including a mode bit, referred to as the pre-serialization mode bit. When the pre-serialization mode bit is clear, the default behavior is selected. When the pre-serialization mode bit is set, the enhance behavior is selected. The pre-serialization mode bit is in the control register in the L1CC as shown in FIG. 5.

In both default and enhanced modes, outstanding loads do not block the SFENCE and non-WOPWC stores need to be globally observed before the SFENCE can be accepted by the L1CC. The MPRE bit only affects the interaction between WOPWC requests and SFENCE. In the default behavior, all WOPWC buffers need to be de-allocated before the SFENCE. In the enhanced mode, all WOPWC buffers need to be globally observed before the SFENCE can be accepted by the L1CC. A WOPWC fill buffer is globally observed once the last chunk of that buffer issuing an external bus request becomes globally observed. Control logic circuit is added to keep track of the global observations to be sent out for a WOPWC buffer. In other words, in the enhanced mode, the outstanding loads do not block the SFENCE and all stores need to be globally observed before the SFENCE can be accepted by the L1CC and do not need to wait for de-allocation for any type of store.

Post-Serialization Techniques

The post serialization techniques support the operations subsequent to the SFENCE. Two techniques are used, one is for the default behavior and one is for the enhanced behavior. They are controlled by the post-serialization mode bit (MPOST) in the control register as shown in FIG. 5.

In the default behavior, instructions following the SFENCE in program order are blocked from being dispatched to the L1CC until the L1CC accepts the SFENCE. Coupled with the pre-serialization techniques, this implies that all instructions preceding the SFENCE in program order are guaranteed to be globally observed before any instruction which follows the SFENCE in program order is globally observed.

In the enhanced behavior, loads subsequent to the SFENCE are allowed to be executed out of order with respect to the SFENCE. This behavior usually enhances the performance because the loads do not have to wait for the SFENCE to be completed. However, there are some situations where this out-of-order execution may cause performance degradation. An example is when the load subsequent to the SFENCE references the same cache line as the write combining stores prior to the SFENCE. Since the SFENCE has not been accepted by the L1CC, the prior WC stores may still be in progress. An out-of-order load may get in the middle of the WC stores, causing the eviction of the WC buffer. Therefore subsequent WC stores, which are still prior to the SFENCE, to the same cache line are no longer write combining, losing the performance improvement by the WC protocol.

SCENARIOS OF STORE FENCING

Figure 6:
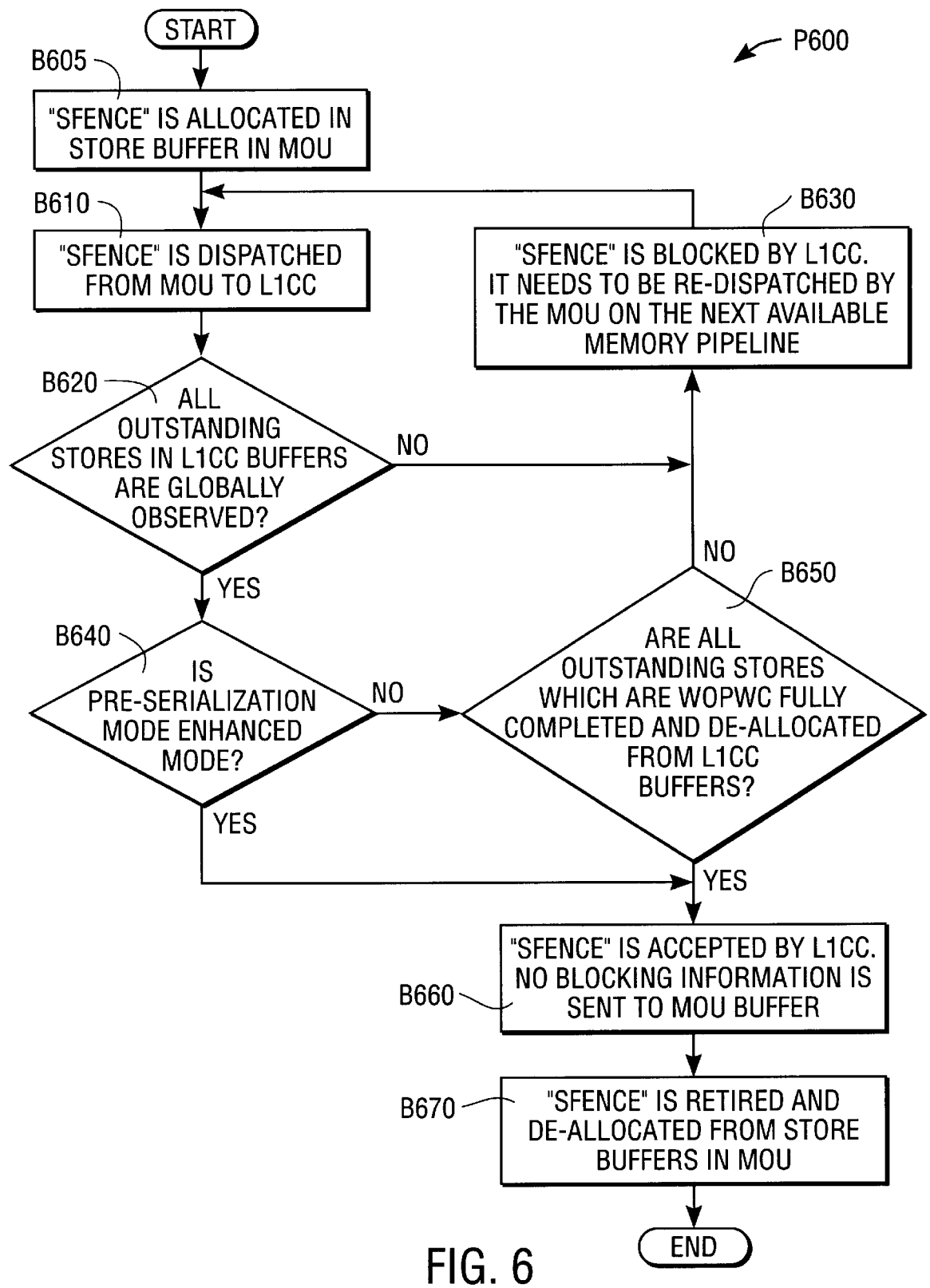
FIG. 6 is a flowchart illustrating pre-serialization techniques for SFENCE instruction according to one embodiment of the invention.

FIG. 6 is a flowchart illustrating a process P600 for the pre-serialization techniques for the SFENCE instruction according to one embodiment of the invention. It is assumed that the SFENCE has been allocated in the store buffer in the memory ordering unit (MOU) and all previous instructions have been dispatched and accepted by the L1CC.

Upon START, the process P600 enters block B610 which dispatches the SFENCE instruction from the memory ordering unit (MOU) to the L1 cache controller (L1CC). Then the process P600 enters block B620 to determine if all outstanding stores in the L1CC buffers are globally observed. If NO, the process P600 enters block B630. In block B630, the L1CC blocks the SFENCE indicating that store instructions prior to the SFENCE have not been globally observed. It should be noted that non-globally observed loads do not block the SFENCE. Upon receipt of the blocking signal from the L1CC, the MOU will attempt to re-dispatch the SFENCE in the next available memory pipeline as shown in block B610.

If all outstanding stores are globally observed, the process P600 enters block B640 to determine if the current pre-serialization mode is the enhanced behavior mode (e.g., by inspecting the MPRE bit as shown in FIG. 5). If NO, (i.e., the default behavior mode is selected), the process P600 enters block B650. If YES, the process P600 enters block B660. If the embodiment does not support the selection between the default and enhanced pre-serialization modes block 540 is not available and the process P600 enters block P550 or P560 as appropriate.

In block B650, the process P600 determines if all the weakly ordered partially write combining (WOPWC) buffers are fully completed and de-allocated from the L1CC buffers. If NO, the process P600 goes back to block B630 to block the SFENCE. If YES, the process S550 proceeds to block B660.

In block B660, the SFENCE is accepted by the L1CC and the L1CC does not send any blocking information to the MOU buffer. Then the process P600 enters block B670 to retire the SFENCE and de-allocates the store buffer in the MOU. The process P600 then terminates.

Figure 7:
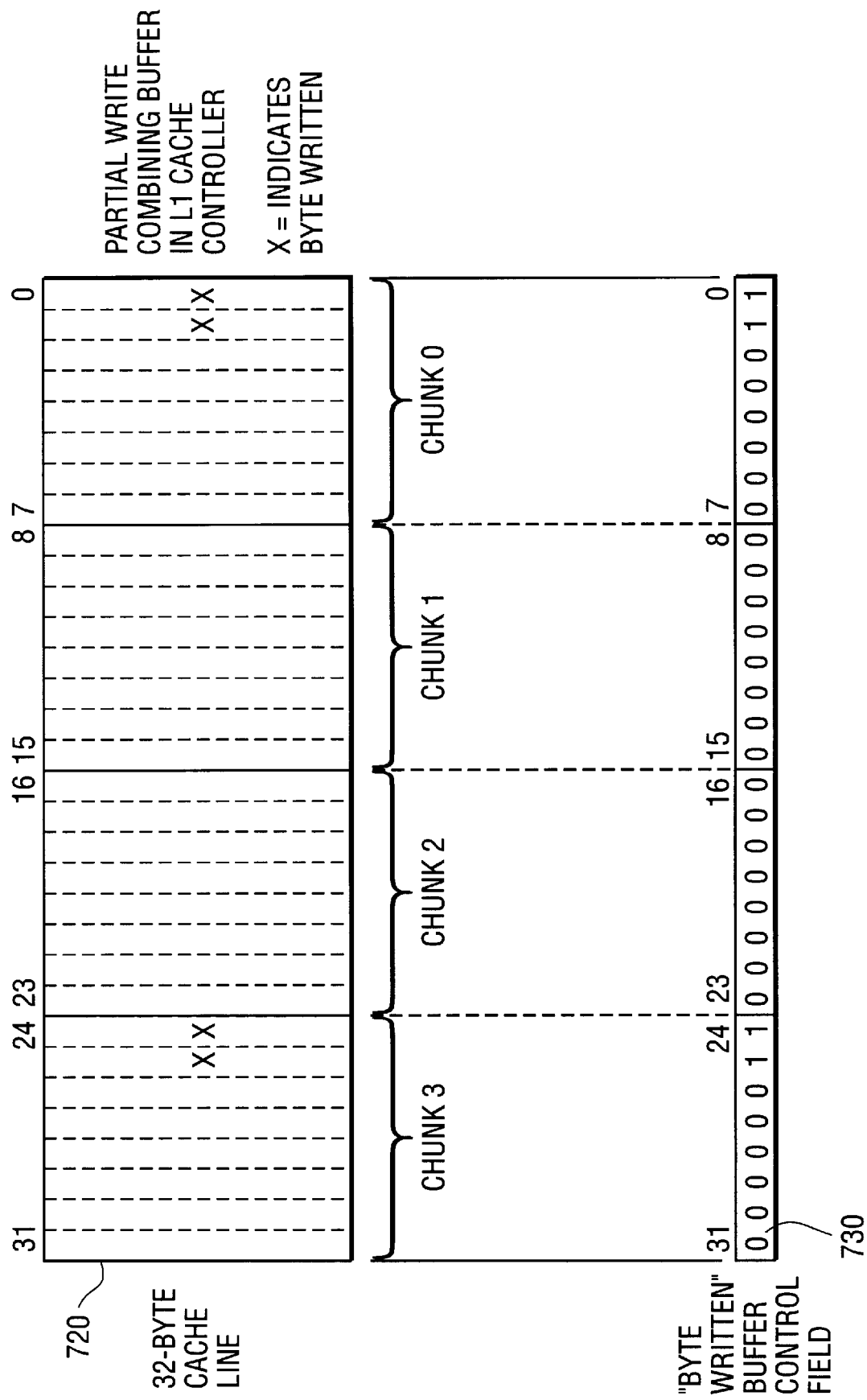
FIG. 7 is a diagram illustrating a partial write combining buffer and one of its control fields in the L1 cache controller according to one embodiment of the invention.

FIG. 7 is a diagram illustrating a partial write combining buffer in the L1 cache controller and one of its control fields, according to one embodiment of the invention.

For the illustrated embodiment, the WC buffer 720 corresponds to a 32-byte cache line. The cache line is divided into 4 chunks, each chunk has 8 bytes. As shown in FIG. 7, chunks 0, 1, 2, and 3 correspond to bytes 0–7, 8–15, 16–23, and 24–31, respectively.

The byte-written buffer control field 730 is 32-bit wide. Each bit in the buffer control field 730 correspond to a byte in the WC buffer 720. As shown in FIG. 7, bits 0 through 31 of the buffer control field 730 correspond to bytes 0 through 31 in the WC buffer 730, respectively. A zero bit in the buffer control field 730 indicates that the corresponding byte is not written. A "1" bit in the buffer control field indicates that the corresponding byte has been written from the core.

In the example shown in FIG. 7, the WC buffer is partially written. Bytes 0 and 1 in chunk 0 and bytes 24 and 25 in chunk 3 are written. Correspondingly, bits 0, 1, 24, and 25 in the buffer control field 730 are set to "1". By monitoring the buffer control field 730, it is possible to determine the number of required global observations. In this example the number of required global observation is two, since there are two chunks with at least one byte written.

Figure 8:
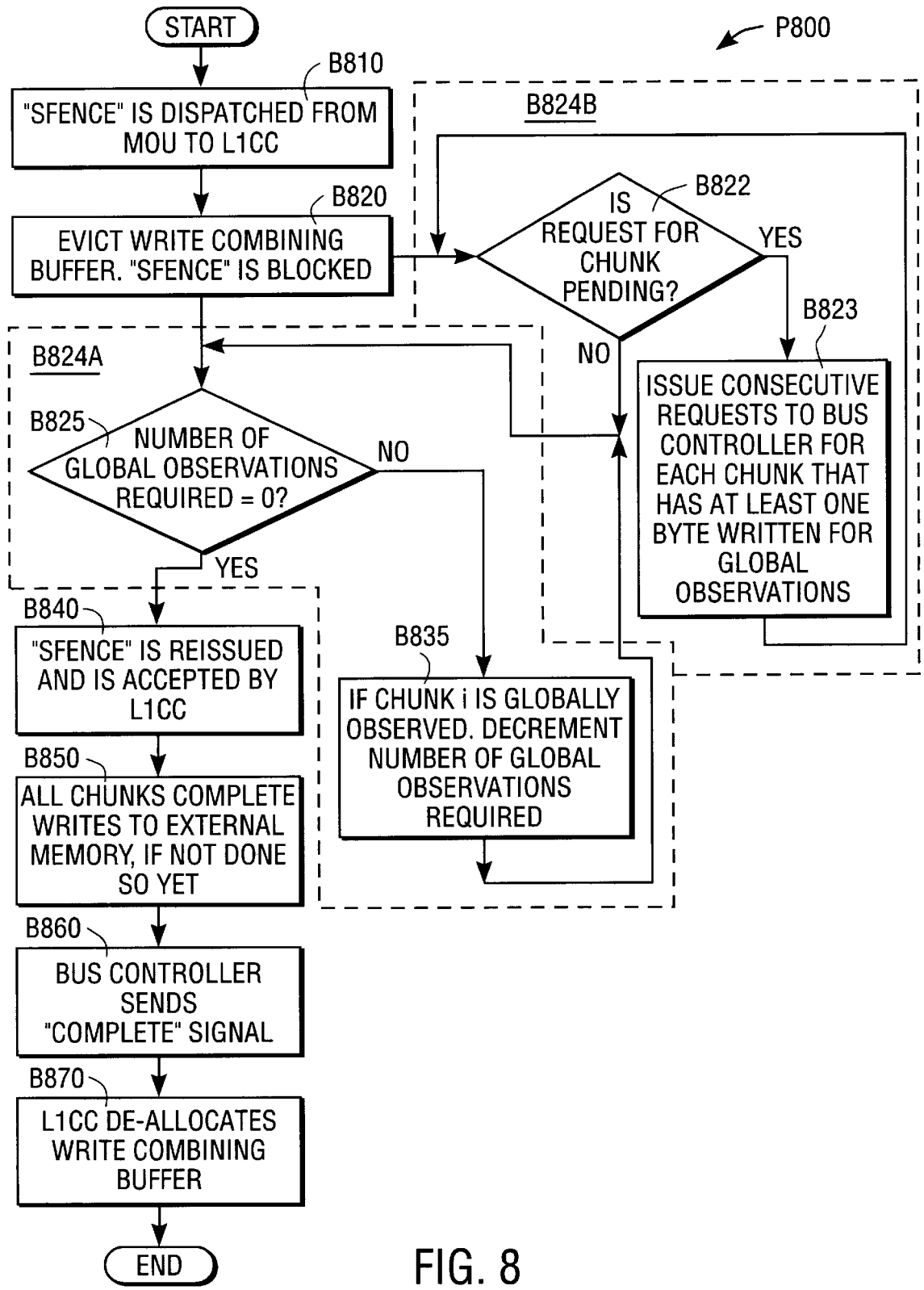
FIG. 8 is a flowchart illustrating a process for a weakly ordered partial write combining buffer to become globally observed according to one embodiment of the invention.

FIG. 8 is a flowchart illustrating a process P800 for a weakly ordered partial write combining buffer to become globally observed according to one embodiment of the invention. It should be noted that the "number of global observations required" control field is only used on the WOPWC buffers.

Upon START, the process P800 enters block B810. In block B810, the SFENCE is dispatched from the memory ordering unit (MOU) to the L1CC. Then the process P800 enters block B820. At this point the process P800 branches out to two parallel modules: modules B824A and B824B. Module B824A includes blocks SB825 and B835. Module B824B includes blocks B822 and B823. The two modules operate in parallel. Module B824B provides information about global observations to module B824A. In block B820, the WC buffer is evicted and SFENCE is blocked by the L1CC. The process P800 then enters block B825 to determine if the number of required global observations is equal to 0. If NO, the process P800 enters block B835. If YES, the process P800 enters block B840.

In block B835, the corresponding chunk is now globally observed. The number of the required global observations is decremented. The process P800 then return to block B825. This is repeated until all chunks with at least one byte written are globally observed.

In block B840, the SFENCE is re-issued and accepted by the L1CC because at this point, the entire buffer has been globally observed. The process P800 then enters block B850. In block B850, the chunk(s) completes the write to the external memory. The process P800 enters block B860 for the bus controller to send a complete signal to the L1CC informing the L1CC that the writing has been completed. Then the process P800 enters block B870 where the L1CC de-allocates the entries in the write combining buffer. The process P800 then terminates.

Figure 9A:
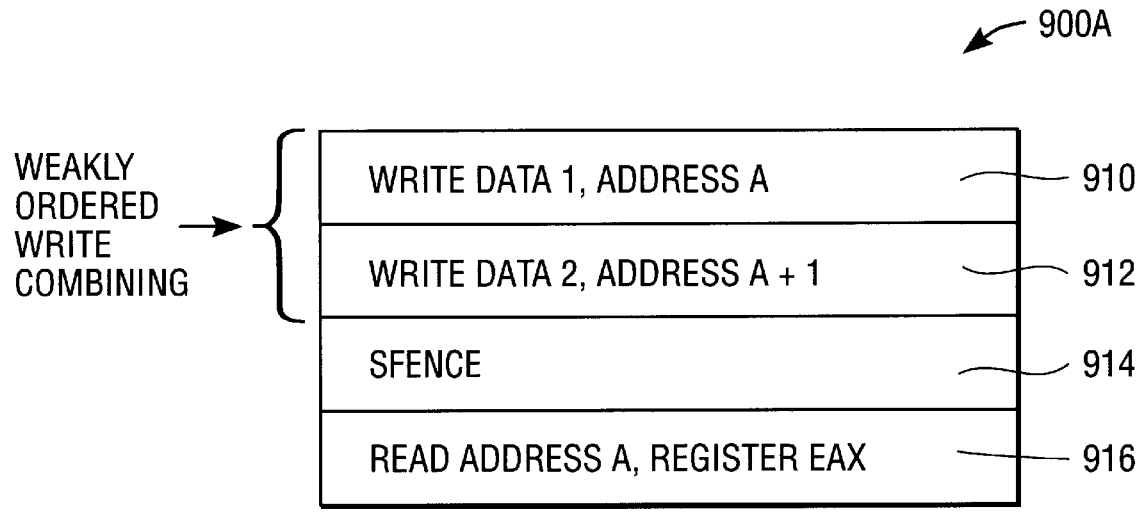
FIG. 9A is a diagram illustrating a sequence of instructions using weakly ordered write combining instructions according to one embodiment of the invention.

FIG. 9A is a diagram illustrating a sequence of instructions 900A using weakly ordered write combining instructions according to one embodiment of the invention. This sequence includes instructions 910, 912, 914, and 916.

Instruction 910 is a write of data to a memory location at address A. Instruction 912 is a write of data2 to a memory location at address A+1. Instruction 914 is the SFENCE instruction. Instruction 916 is a read from the memory location at address A to the register EAX. The instructions 910 and 912 are two weakly ordered partial WC stores to the same cache line. The addresses A and A+1 are consecutive addresses and assumed to correspond to the same cache line. The instruction 916 is a load from the same cache line. The process of execution of these instruction will be explained later.

Figure 9B:
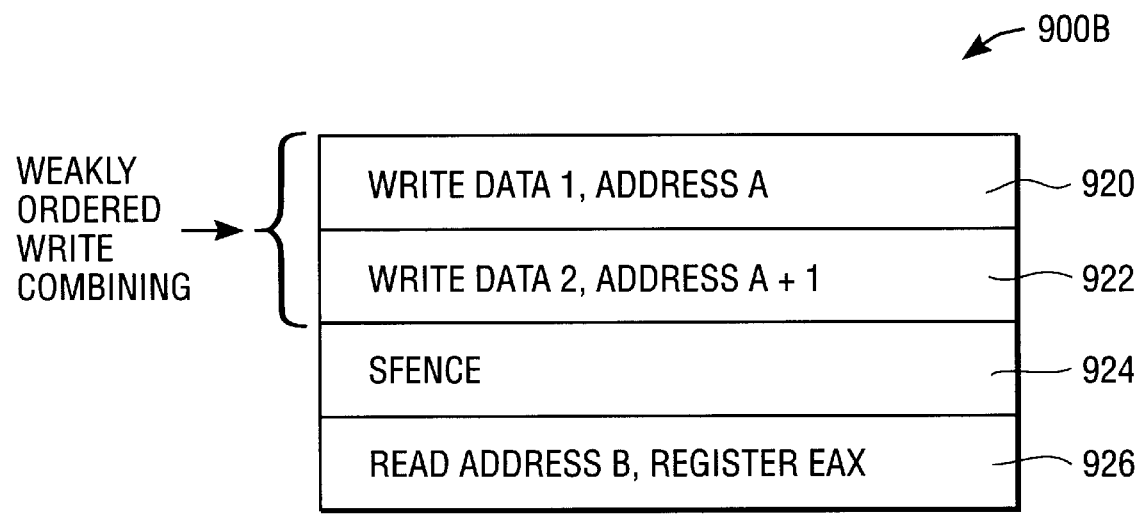
FIG. 9B is a diagram illustrating another sequence of instructions using weakly ordered write combining instructions according to one embodiment of the invention.

FIG. 9B is a diagram illustrating a sequence of instructions 900B using weakly ordered write combining instructions according to one embodiment of the invention. This sequence includes instructions 920, 922, 924, and 926.

Instruction 920 is a write of data1 to a memory location at address A. Instruction 922 is a write of data2 to a memory location at address A+1. Instruction 924 is the SFENCE instruction. Instruction 926 is a read from the memory location at address B to the register EAX. The instructions 920 and 922 are two weakly ordered partial WC stores to the same cache line. The addresses A and A+1 are consecutive addresses and assumed to correspond to the same cache line. The instruction 926, however, is a load from a different cache line. The process of execution of these instruction will be explained later.

Figure 10:
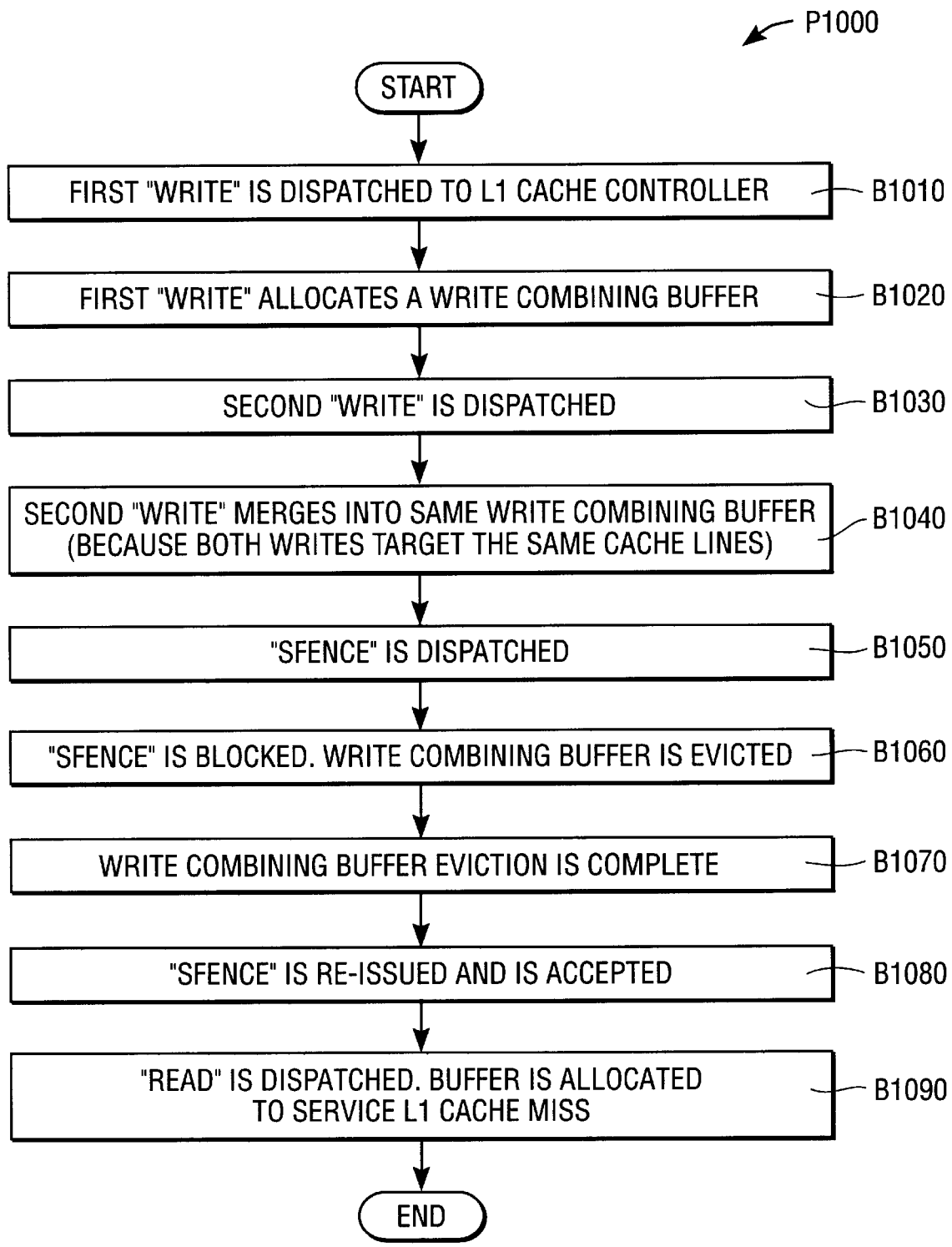
FIG. 10 is a flowchart illustrating a process to carry out the sequences of instructions in FIG. 9A or FIG. 9B when the post-serialization mode is the default mode in an out-of-order execution processor according to one embodiment of the invention.

FIG. 10 is a flowchart illustrating a process S1000 to carry out the sequence 900A or 900B in FIG. 9A or FIG. 9B, respectively, when the current post-serialization mode is the default behavior mode. It is also a process to carry out the sequence 900B in FIG. 9B when the post serialization bit is 1. Although the process S1000 is applicable for the sequence 900B of FIG. 9B when the post-serialization mode is either the default or enhanced mode, the process when the mode is the enhanced mode gives a better performance if loads are dispatched by the MOU out of order. The reason for better performance is that the load has no address dependencies with the writes and executes out of order; thus, its issuance and write-back to core are not dependent on the completion of the SFENCE. Therefore, there are no idle wasteful periods.

Upon START, the process S1000 enters block B1010 where the first WRITE (instructions 910 and 920 in FIGS. 9A and 9B) is dispatched to the L1CC. Then the process S1000 enters block B1020 where this first WRITE allocates a write combining buffer in the L1CC. Next, in block B1030, the second WRITE (instructions 912 and 922 in FIGS. 9A and 9B) is dispatched to the L1CC. The process S1000 then enters block B1040.

In block B1040, the second WRITE merges into the same write combining buffer with the first WRITE because both WRITE's target the same cache line. Thereafter, at block B1050, the SFENCE is dispatched to the L1CC. At block B1060, the SFENCE is blocked and the write combining buffer is evicted, i.e., the contents are transferred to the external memory. The process S1000 enters block B1070 where the WC buffer eviction is completed. Then the process P1000 enters block B1080 where the SFENCE is re-issued and is accepted by the L1CC because the WC buffer eviction has been completed. The process S1000 then enters block B1090 which corresponds to the instruction 816 in FIG. 8A. In block B1090, the read is dispatched to the L1CC. Since the cache line has been evicted and written to the main memory, the buffer is allocated to service the L1 cache miss. The process S1000 then terminates.

Figure 11:
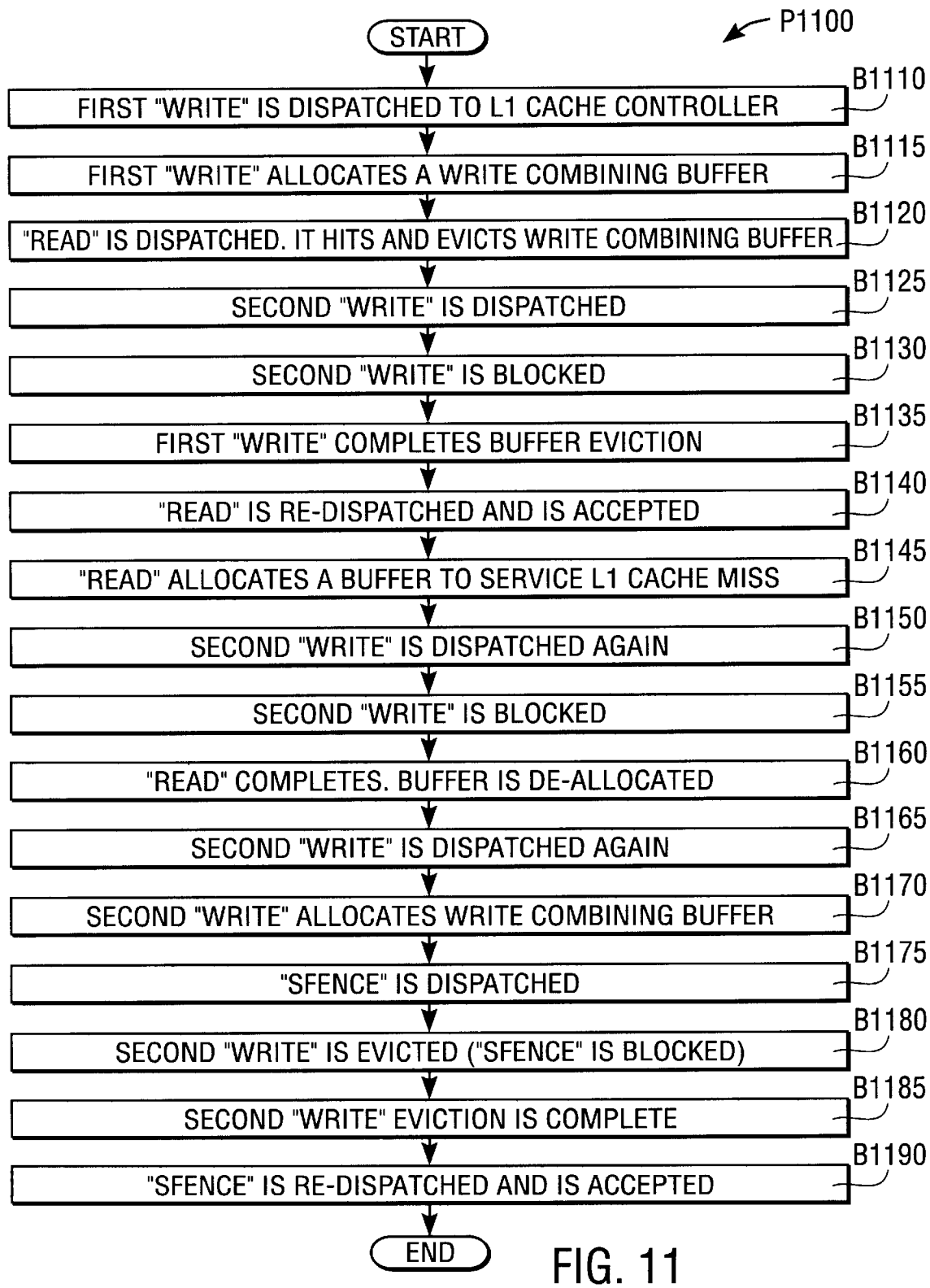
FIG. 11 is a flowchart illustrating a process to carry out the sequence of instructions in FIG. 9A when the post-serialization mode is the enhanced mode in an out-of-order execution processor according to one embodiment of the invention.

FIG. 11 is a flowchart illustrating a process S1100 to carry out the sequence of instructions in FIG. 9A when the post-serialization mode is the enhanced mode according to one embodiment of the invention.

Upon START, the process P1100 enters block B1110 where the first WRITE is dispatched to the L1CC. The first WRITE then allocates a WC buffer in the L1CC in block B1115. The process P1100 then enters block B1120 where the READ is dispatched to the L1CC. Since the READ references the same cache line as the first WRITE, it hits the cache and evicts the WC buffer to maintain the ordering constraints. The process P1100 then enters block B1125 where the second WRITE is dispatched to the L1CC. Since the eviction is in progress, the second WRITE is blocked by the L1CC in block B1130. The process P1100 then enters block B1135 where the first WRITE completes the WC buffer eviction. The process P1100 then enters block B1140.

In step 1040, the READ is re-dispatched and is accepted by the L1CC. In block B1145, the READ allocates a buffer to service the L1 cache miss. The process P1100 then enters block B1150 where the second WRITE is re-dispatched to the L1CC. At this time, a cache line fill is in progress to service the READ miss, the second WRITE is blocked in block B1155. The process P1100 then enters block B1160 where the READ completes and the buffer is de-allocated. Thereafter, the second WRITE is re-dispatched in block B1165. This time, the second WRITE is accepted by the L1CC. The second WRITE allocates the WC buffer in block B1170. The process P1100 then enters block B1175.

In block B1175, the SFENCE is dispatched to the L1CC. The process P1100 then enters block B1180 where the second WRITE is evicted and SFENCE is blocked. The second WRITE eviction is completed in block B1185. The process P1100 then enters block B1190 where the SFENCE is again re-dispatched. This time, since all the evictions are completed, the SFENCE is accepted. The process P1100 then terminates.

Figure 12:
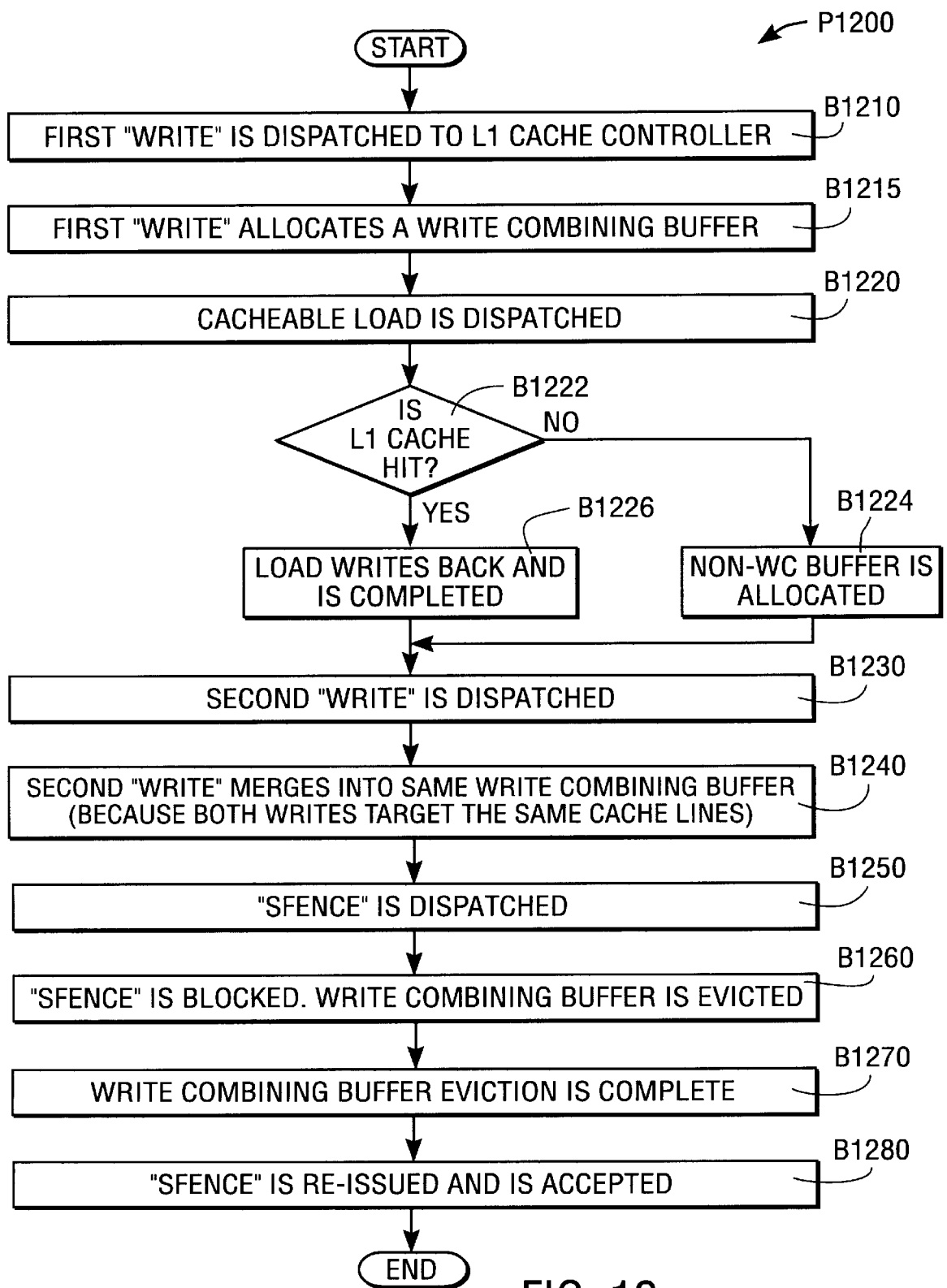
FIG. 12 is a flowchart illustrating a process to carry out the sequence of instructions in FIG. 9B when the post-serialization mode is the enhanced mode in an out-of-order execution processor according to one embodiment of the invention.

FIG. 12 is a flowchart illustrating a process P1200 to carry out the sequence 900A or 900B in FIG. 9A or FIG. 9B, respectively, when the post-serialization mode is the enhanced mode in an out of order execution processor, according to one embodiment of the invention.

Upon START, the process P1200 enters block B1210 where the first WRITE (instructions 910 and 920 in FIGS. 9A and 9B) is dispatched to the L1CC. Then the process P1200 enters block B1215 where this first WRITE allocates a write combining buffer in the L1CC. Next, in block B1220, a cacheable load is dispatched to the L1CC. The process P1200 then enters block B1222 to determine if the cacheable load results in a L1 cache hit. If NO, the process P1200 enters block B1224. If YES, the process P1200 enters block B1226.

In block B1224, the process P1200 allocates a non-WC buffer, assuming that such a buffer is available. Then the process P1200 enters block 1130. In block 1126, the load writes back to core and is completed. Then the process P1200 enters block 1130. In block B1230, the second WRITE (instruction 922 in FIG. 9B) is dispatched to the L1CC. The process P1200 then enters block B1240.

In block B1240, the second WRITE merges into the same write combining buffer with the first WRITE because both WRITE's target the same cache line. Thereafter, at block B1250, the SFENCE is dispatched to the L1CC. In block B1260, the SFENCE is blocked and the write combining buffer is evicted, i.e., the contents are transferred to the external memory. The process P1200 enters block B1270 where the WC buffer eviction is completed. Then the process B1290 enters block B1290 where the SFENCE is re-issued and is accepted by the L1CC because the WC buffer eviction has been completed. The process P1200 then terminates.

The enhanced behavior mode as depicted by the process P1200 thus provides a better performance than the default behavior mode because the load is serviced in parallel with the WC writes, rather than having to wait for the completion of the SFENCE.

This invention thus discloses a method to synchronize write combining stores using a fencing mechanism via the SFENCE instruction. The SFENCE instruction guarantees that all WC stores prior to the SFENCE are globally observed. The implementation of the SFENCE instructions allows additional performance improvement by allowing out-of-order execution of load instruction subsequent to the SFENCE. With this synchronization mechanism, the processor's performance is improved significantly in applications where the WC stores are necessary between the processor and consumer hardware.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for synchronizing weakly ordered write combining operations, the method comprising:

dispatching a store fence instruction to a memory controller, the memory controller having a buffer;

if the buffer contains at least a data written by at least one of the weakly ordered write combining operations prior to the store fence instruction, blocking the store fence instruction until a block in the buffer containing the data is globally observed, otherwise accepting the store fence instruction.

2. The method of claim 1 further comprises accepting the store fence instruction after the block containing the data is globally observed.

3. The method of claim 1 wherein the block is globally observed and subsequently is transferred to an external memory.

4. The method of claim 1 further comprises de-allocating the buffer before or after accepting the store fence instruction.

5. The method of claim 1 further comprises:

blocking an instruction subsequent to the store fence instruction until the memory controller accepts the store fence instruction.

6. The method of claim 1 further comprises:

if there is no address dependency between an instruction subsequent to the store fence instruction and the weakly ordered write combining operations, the instruction subsequent to the store fence instruction is allowed to execute out of order with respect to the store fence instruction.

7. The method of claim 1 wherein the memory controller is a level 1 cache controller.

8. The method of claim 1 wherein the buffer stores a cache line.

9. The method of claim 8 wherein the cache line includes four blocks, each block including 32 bytes.

10. The method of claim 1 further comprises keeping track of a required number of global observations in the buffer using a control field.

11. An apparatus for synchronizing weakly ordered write combining operations, the apparatus comprising:

a dispatch station for dispatching a store fence instruction; and a memory controller coupled to the dispatch station, the memory controller having a buffer, the memory controller blocking the store fence instruction until a block in the buffer containing the data is globally observed if the buffer contains at least a data written by at least one of the weakly ordered write combining operations prior to the store fence instruction, otherwise the memory controller accepting the store fence instruction.

12. The apparatus of claim 11 wherein the memory controller accepts the store fence instruction after the block containing the data is globally observed.

13. The apparatus of claim 11 wherein the block is globally observed and subsequently is transferred to an external memory.

14. The apparatus of claim 11 further comprises a de-allocating circuit for de-allocating the buffer before or after accepting the store fence instruction.

15. The apparatus of claim 11 wherein the memory controller blocks an instruction subsequent to the store fence instruction until the memory controller accepts the store fence instruction.

16. The apparatus of claim 11 wherein the memory controller allows an instruction subsequent to the store fence instruction to execute out of order with respect to the store fence instruction if there is no address dependency between the instruction and the weakly ordered write combining operations.

17. The apparatus of claim 11 wherein the memory controller is a level 1 cache controller.

18. The apparatus of claim 11 wherein the buffer stores a cache line.

19. The apparatus of claim 18 wherein the cache line includes four blocks, each block including 32 bytes.

20. The apparatus of claim 11 wherein the memory controller contains a control field to keep track of a required number of global observations in the buffer.

* * * * *

UNITED STATES PATENT AND TRADEMARK OFFICE
CERTIFICATE OF CORRECTION

PATENT NO.    : 6,073,210
DATED         : June 6, 2000
INVENTOR(S)   : Palanca et al.

It is certified that error appears in the above-identified patent and that said Letters Patent is hereby corrected as shown below:

Column 10,
Line 49, delete "data", insert -- datal --.

Signed and Sealed this

Thirteenth Day of May, 2003

JAMES E. ROGAN
*Director of the United States Patent and Trademark Office*